(12) United States Patent
Bakker

(10) Patent No.: US 12,325,793 B2
(45) Date of Patent: Jun. 10, 2025

(54) LAYERED HIGH-VOID-FRACTION MATERIAL

(71) Applicant: PLANTICS B.V., Arnhem (NL)

(72) Inventor: Wridzer Jan Willem Bakker, Arnhem (NL)

(73) Assignee: PLANTICS B.V., Arnhem (NL)

( * ) Notice: Subject to any disclaimer, the term of this patent is extended or adjusted under 35 U.S.C. 154(b) by 869 days.

(21) Appl. No.: 17/603,235

(22) PCT Filed: Apr. 15, 2020

(86) PCT No.: PCT/EP2020/060598
§ 371 (c)(1),
(2) Date: Oct. 12, 2021

(87) PCT Pub. No.: WO2020/212427
PCT Pub. Date: Oct. 22, 2020

(65) Prior Publication Data
US 2022/0186024 A1    Jun. 16, 2022

(30) Foreign Application Priority Data
Apr. 15, 2019   (EP) .................................... 19169179

(51) Int. Cl.
| | | |
|---|---|---|
| B32B 5/28 | (2006.01) | |
| B32B 7/00 | (2019.01) | |
| B32B 27/36 | (2006.01) | |
| C08J 5/24 | (2006.01) | |
| C08L 67/02 | (2006.01) | |

(52) U.S. Cl.
CPC .............. *C08L 67/02* (2013.01); *C08J 5/244* (2021.05); *C08J 5/245* (2021.05); *C08J 5/246* (2021.05); *C08J 2367/02* (2013.01); *C08J 2401/02* (2013.01); *C08J 2475/04* (2013.01); *C08J 2497/02* (2013.01); *C08L 2205/16* (2013.01)

(58) Field of Classification Search
None
See application file for complete search history.

(56) References Cited

U.S. PATENT DOCUMENTS

| | | | | |
|---|---|---|---|---|
| 4,365,423 A | * | 12/1982 | Arter ........................ | F26B 13/10 427/372.2 |
| 4,886,564 A | * | 12/1989 | Pagendarm ............... | B05C 1/14 34/448 |
| 2012/0276400 A1 | * | 11/2012 | Nilsson .................... | D21J 3/00 428/537.1 |
| 2013/0101865 A1 | * | 4/2013 | Ren ........................ | D21H 19/82 428/481 |
| 2014/0061554 A1 | | 3/2014 | Alberst et al. | |

FOREIGN PATENT DOCUMENTS

| | | |
|---|---|---|
| CN | 103502331 A | 1/2014 |
| CN | 103502332 A | 1/2014 |
| EP | 2511354 A1 | 10/2012 |
| EP | 2697321 A1 | 2/2014 |
| JP | S51-033160 A | 3/1976 |
| JP | H11-133980 A | 5/1995 |
| JP | 2000-119999 A | 4/2000 |
| JP | 2001-329630 A | 11/2001 |
| WO | 2006028221 A1 | 3/2006 |
| WO | 2012140238 A1 | 10/2012 |
| WO | 2018092888 A1 | 5/2018 |

OTHER PUBLICATIONS

Second Examination Report for corresponding Chinese application No. 202080028531.5; dated Feb. 2, 2024 (17 pages) Machine Translation.
International Search Report and Written Opinion for corresponding International application No. PCT/EP2020/060598; dated Jun. 19, 2020 (12 pages).
Communication pursuant to Article 94(3) EPC for corresponding European application No. 20717233.9; dated Feb. 27, 2024 (5 pages).
Kawasaki, Tamami, et al. "In-plane shear properties of the wood-based sandwich panel as a small shear wall evaluated by the shear test method using tie-rods." Journal of Wood Science 49.3 (2003): 199-209.
Kawasaki, Tamami, et al. "Thermal insulation properties of wood-based sandwich panel for use as structural insulated walls and floors." Journal of Wood Science 52.1 (2006): 75-83.
Notice of Reasons for Rejection for corresponding Japanese application No. 2021-560685; dated Feb. 8, 2024 (9 pages).
Office Action for corresponding Brazilian application No. BR112021019934-9; dated Sep. 13, 2023 (8 pages) Machine Translation.
Examination Report for corresponding Indian application No. 202117044263; dated Sep. 25, 2023 (5 pages).

* cited by examiner

*Primary Examiner* — Michael J Feely
(74) *Attorney, Agent, or Firm* — Mendelsohn Dunleavy PC; Kevin J. Dunleavy

(57) ABSTRACT

The invention pertains to a layered high-void-fraction material comprising a composite surface layer comprising structural material and a polyester derived from an aliphatic polyol with 2-15 carbon atoms and an aliphatic polycarboxylic acid with 3 to 15 carbon atoms, wherein the surface layer is connected to a high-void-fraction layer of structural material. As compared to a high-void-fraction material without the composite surface layer, the material has, among others, improved surface properties, and improved bending stiffness, while insolation properties for both sound and heat are maintained. The material may be used, e.g., as insulating material, as filtration material, or in hydroponics.

20 Claims, 5 Drawing Sheets

LAYERED HIGH-VOID-FRACTION MATERIAL

CROSS-REFERENCE TO RELATED APPLICATIONS

This application is a 371 continuation of International application no. PCT/EP2020/060598, filed on Apr. 15, 2020, which, in turn, claims priority to European patent application no. 19169179.9, filed on Apr. 15, 2019.

BACKGROUND OF THE INVENTION

The invention pertains to a layered high-void-fraction material. The invention pertains in particular to a layered high-void-fraction material provided with a composite surface layer. It has been found that the layered high-void-fraction material according to the invention shows improved properties as compared to the high-void-fraction material without the layer.

Many insulation materials, whether they are for heat insulation of sound insulation, are high-void-fraction materials. They rely in essence on stagnant air entrapped in a solid structure such as between fibers, particles, or layers. Examples of insulation materials are mats and plate materials, whether bent or flat, of mineral wool or glass wool, or based on polymer such as polyurethane. A recent development is the use of high-void-fraction plate material based on renewable cellulose-based materials such as hemp, flax, cotton, metises, and paper/cardboard, and animal-derived materials such as wool or down. Most of these high-void-fraction materials do not have structural strength or bending stiffness. In consequence, they need to be used in combination with a construction frame, and generally in combination with a surface covering, e.g., of plasterboard or other boardlike materials, to provide, among others, mechanical strength, fire resistance and a surface structure which can be painted, wallpapered, or otherwise provided with an attractive visual appearance.

The combination of the flexible high-void-fraction insulation material and a separate board cover has a number of disadvantages, however. The fact that at least two types of material have to be installed separately makes it necessary to have an installation process with at least two steps, which makes it labor-intensive. Further, it requires additional materials. Additionally, the use of solid (non porous) board materials could negate any sound-absorbing properties of the insulation material. Further, it may detrimentally affect temperature/moisture and other climate regulation properties of cellulose-based materials, and will lead to an increased $CO_2$ footprint. Also, most plasterboards and wood based panels are under scrutiny because of the possible emission of the radioactive radon gas and carcinogenic and toxic formaldehyde gas.

There is therefor need in the art for a high-void-fraction material which has increased mechanical strength, and for which it may be possible to dispense with the use of a covering plate material, therewith addressing the issues raised above. This new material may also find application in other situations where high-void fraction materials are used, e.g., filtration and hydroponic applications.

BRIEF SUMMARY OF THE INVENTION

The present invention pertains to a layered high-void-fraction material comprising a composite surface layer comprising structural material and a polyester derived from an aliphatic polyol with 2-15 carbon atoms and an aliphatic polycarboxylic acid with 3 to 15 carbon atoms, wherein the surface layer is connected to a high-void-fraction layer of structural material.

It has been found that, as compared to the high-void-fraction structural material itself, the material provided with a composite surface layer has increased mechanical strength. Further, it may be possible to use it without surface covering. It may also require less support from a mechanical frame. Further advantages of the material according to the invention will become apparent from the further specification.

It is noted that WO2012/140238 describes the use of a polyester polymer derived from an aliphatic polyol with 2-15 carbon atoms and an aliphatic polycarboxylic acid as coating or in the manufacture of laminates. This reference does not disclose the provision of a high-void-fraction material provided with a composite surface layer of a polyester.

The present invention and preferred embodiments thereof with their associated advantages will be discussed in more detail below.

BRIEF DESCRIPTION OF THE DRAWINGS

The invention is illustrated by the following figures, without being limited thereto or thereby.

DETAILED DESCRIPTION OF THE INVENTION

Figure 1:
FIG. 1 shows a picture of a panel according to the invention and its starting material in which the difference in free-standing properties can be seen.
Figure 1:

The layered high-void-fraction material comprises a composite surface layer comprising structural material and a polyester, which surface layer is connected to a high-void-fraction layer of structural material.

The presence of a composite surface layer in combination with a layer of structural material is a key feature of the present invention. It means that when looking at a cross-section of the layered material according to the invention, part of the material contains the polyester and part of the material does not contain the polyester. In other words, a polyester-containing composite surface layer can be distinguished from a polyester-free layer of structural material. The boundary between the two layers can easily be determined through visual inspection, or by analyzing the polymer content of the layers at different locations in the material. The boundary can be identified through a stepwise change in polymer content over a short distance, e.g., an increase in polymer content of at least a factor 5 over a distance of 2 cm, optionally over a distance of 1 cm, optionally over a distance 0.5 cm, optionally over a distance of 0.2 cm.

The composite surface layer may be present on one side of the material, or on more than one side of the material. E.g., where the material has a panel-like shape, that is, a shape where the length and the width of the material are significantly larger than the thickness, it is also possible for a composite surface layer to be present on both main faces of the material. In that case, the layer of structural material will be sandwiched between two composite surface layers, and may thus also be regarded as a core layer. It is also possible, and may be preferred to provide composite layers also on one or more sides of the panel.

The layered high-void-fraction material may be manufactured from the conventional high-void fraction structural materials used in the art as insulation material for heat and/or noise. Examples are panels and mats, whether flat or shaped, based on ceramic wool such as glass-wool and stone-wool, polymer-based panels, cellulose-based panels, and materials based on animal-based products such as wool, feathers, and down. Of course, the high-void fraction material used on the present invention may also comprise mixtures of various components, e.g., cellulose-based materials in combination with stone wool or glass wool, etc. The starting materials may be flat or curved, e.g., in the form of (half-cylinders) as used for insulating curved surfaces.

The starting material has a high void fraction, e.g., a void fraction of at least 0.5, in particular at least 0.6, more in particular at least 0.7, still more in particular at least 0.8. As a general upper limit, a value of at most 0.995, in particular at most 0.98, may mentioned. The void fraction can be calculated from the density of the high-void-fraction material itself, i.e., the blanket or panel, and the density of the composition from which the material is built up, e.g., glass, stone, polymer, or cellulose based material. Thus, a void fraction reflects the volume of voids in a material (which may be filled with a gas, e.g. air) over the total volume of the material. The values given above also apply to the high-void-fraction layer of structural material of the layered high-void-fraction material according to the invention. Consequently, the void fraction of the layered high-void-fraction material can be calculated from the density of the layered high-void-fraction material and the density of the matter building up the layered high-void-faction material.

Cellulose-based material may be based on any cellulose-containing based material. Examples include wood pulp and paper, including cardboard. In one embodiment, the cellulose-based material is derived from so-called virgin pulp which is obtained directly from the wood pulping process. This pulp can come from any plant material but mostly from wood. Wood pulp comes from softwood trees such as spruce, pine, fir, larch and hemlock, and hardwoods such as eucalyptus, popular, aspen and birch. In one embodiment, the cellulose-based material comprises cellulose material derived from recycled paper, such as cellulose pulp obtained from regenerated books, papers, newspapers and periodicals, egg cartons, and other recycled paper or cardboard products. Combinations of cellulose sources may also be used. Cellulose-based material can also be derived from sources such as flax, hemp, or cotton, and other renewable plant-based materials. The term cellulose-based materials based is intended to mean that the object contains at least 50 wt. % of a cellulose material, e.g., derived from sources such as fresh or used paper, fresh or used cardboard, wood or other plant material in any form, or combinations thereof. In particular, the material or container contains at least 70 wt. % of cellulose material, more in particular at least 80 wt. %.

The starting material is often in the form of a layer, sheet, mat, or panel, which in the context of the present specification are all synonyms for a shape where the length and the width of the material are significantly larger than the thickness.

In general, the starting material has a thickness of at least 0.5 cm, in particular at least 1 cm. As a general upper limit a value of at most 40 cm may be mentioned. It may be preferred for the starting material to have a thickness in the range of 1 to 30 cm, in particular 2-15 cm. The width and the length of the starting material are not critical to the invention. Both will generally be at least 3 times the thickness of the starting material, e.g., at least 30 cm, in particular at least 50 cm. The width is generally not more than 4 meters, in particular, for practical purposes, at most 2 meters. The length of the material may be indefinite, where the material is manufactured in a continuous process. For practical purposes, the length may be at most 20 m, in particular at most 15 meters, e.g., at most 8 meters, often at most at most 4 meters, depending on the application.

The same dimensions apply to the layered high-void-fraction material according to the invention.

The layered high-void-fraction material comprises a layer of structural material and a composite surface layer comprising structural material and a polyester. The composite surface layer is connected to the layer of structural material through the structural material. For example, where the high-void-fraction material is a stone-wool mat, the composite surface layer consists of stone-wool and the specified polyester, and the composite surface layer is connected to the layer of structural material through the stone-wool fibers. In other words, the structural material is continuous over the boundary between the layer of structural material and the composite surface layer comprising structural material and a polyester.

The composite surface layer generally has a polymer content in the range of 50 wt. % to 99 wt. %, more in particular in the range of 70 wt. % to 95 wt. %, calculated on the weight of the composite surface layer.

The composite surface layer generally has a void fraction in the range of 0.01 to 0.99, in particular in the range of 0.4 to 0.95. The void fraction of the composite layer can be calculated from the density of the composite layer and the densities of the polymer and structural material in the composite layer. While the void fraction is decreased as compared to the void fraction of the starting material, and the layer of structural material of the layered material, it can still be reasonably high. This means the sound absorbing properties of the structural material are maintained at least in part. This is different from the prior art situation where the provision of a plate material in front of the insulation material substantially affects the sound absorbing properties of the material.

The void fraction of the layered high-void-fraction material of the present invention is still relatively high, for example at least 0.5, in particular at least 0.6, more in particular at least 0.7. As a general upper limit, a value of at most 0.98, more in particular at most 0.95, may mentioned. Due to the high void fraction in the product, it retains its insulation properties to a large extent, both for heat and sound. Further, a high void fraction in the product is accompanied by a lower panel weight, which is attractive for many reasons, including handling properties of the panel, transport, etc.

It has been found that the provision of the composite surface layer makes it possible to increase the properties, e.g., bending stiffness, of the high-void fraction material while still retaining an overall high void fraction in the end product, which ensures retention of insulation properties. More specifically, it has been found that it is possible to obtain materials wherein, as compared to the void fraction of the starting product, the void fraction of the final product is in the range of 75-99.5%, in particular in the range of 80-99.5%, more in particular in the range of 85-99.5%.

The thickness of the composite surface layer is generally in the range of 1 mm to 40 mm, depending on the thickness of the layered high-void-fraction material in total. A composite layer with a thickness below 1 mm will generally be too thin to provide the surface structure aimed for. A thickness above 40 mm will generally not lead to further improved properties, but only to increased weight of the material. It may be preferred for the composite surface layer to have a thickness is the range of 2-30 mm, in particular 4-15 mm.

The layered material according to the invention thus comprises one or more composite surface layers and a rear layer, or core layer.

In general, looking at the cross-section of the layered material of the invention, the composite surface layer or layers will make up at most 50% of the cross-section. Where both surfaces of the layered material are provided with composite surface layers, the composite surface layers together preferably make up 2-50% of the cross-section, in particular 5-40%. Where only one surface of the material is provided with a composite surface layer, the composite surface layer preferably makes up 2-30% of the cross-section, in particular 5-20%.

The amount of polymer present on the final product may vary within wide ranges. In interpreting the values it should be taken into account that the starting material is relatively light, due to its high void fraction. Therefore, a relatively large weight percentage of polymer on the final product may still correspond with relatively thin surface layers. In general, the amount of polymer on the final layered material is in the range of 10-95 wt. %, calculated on the total weight of the layered material, more in particular 25-80 wt. %.

As compared to the material from which it is derived, the material according to the invention has improved mechanical properties, in particular increased bending stiffness and surface hardness. Additionally, it may have more attractive surface properties, in particular increased smoothness. Additionally, noise canceling properties of the starting materials are maintained, while mechanical properties are improved.

The present invention makes use of a polyester derived from an aliphatic polyol with 2-15 carbon atoms and an aliphatic polycarboxylic acid with 3 to 15 carbon atoms.

The starting materials for the present invention are an aliphatic polyalcohol with 2-15 carbon atoms and an aliphatic polycarboxylic acid.

The aliphatic polyalcohol used in the present invention comprises at least two hydroxyl groups, in particular at least three hydroxyl groups. In general, the number of hydroxyl groups will be 10 or less, more in particular 8 or less, or even 6 or less, in particular two or three. The polyalcohol has 2-15 carbon atoms. More in particular, the polyalcohol has 3-10 carbon atoms. It is preferred for the polyalcohol to contain no N or S heteroatoms. More specifically it is preferred for the polyalcohol to contain no non-carbon groups than hydroxyl groups. More in particular the polyalcohol is an aliphatic polyalkanol containing only C, H, and O atoms. In a preferred embodiment of the present invention the polyalcohol contains a relatively large number of hydroxyl groups in comparison with its number of carbon atoms. For example, the ratio between the number of hydroxyl groups and the number of carbon atoms ranges from 1:4 (i.e. one hydroxyl group per four carbon atoms, or 8 carbon atoms for a dialcohol) to 1:0.5 (i.e. 2 hydroxyl groups per carbon atom). In particular, the ratio between the number of hydroxyl groups and the number of carbon atoms ranges from 1:3 to 1:1, more specifically, from 1:2 to 1:1. A group of specifically preferred polyalcohols is the group wherein the ratio ranges from 1:1.5 to 1:1. Compounds wherein the ratio of hydroxyl groups to carbon atoms is 1:1 are considered especially preferred.

Examples of suitable polyalcohols include the trialcohols selected from glycerol, sorbitol, xylitol, and mannitol, and dialcohols selected from 1,2-propanediol, 1,3-propanediol, and 1,2-ethanediol. The use of compounds selected from the group of glycerol, sorbitol, xylitol, and mannitol is preferred, with the use of glycerol being particularly preferred.

The preference for glycerol is based on the following: In the first place glycerol has a melting point of 20° C., which allows easy processing, in particular as compared to xylitol, sorbitol, and mannitol, which all have melting points well above 90° C. Further, it has been found that glycerol gives a polymer of high quality, and thus combines the use of an easily accessible source material with good processing conditions and a high-quality product. Mixtures of different types of alcohol may also be used.

It is preferred, however, for the polyalcohol to consist for at least 50 mole % of glycerol, xylitol, sorbitol, or mannitol, in particular of glycerol, preferably at least 70 mole %, more in particular at least 90 mole %, or even at least 95 mole %. In one embodiment the polyalcohol consists essentially of glycerol.

The use of glycerol which is a side product of the manufacture of biodiesel by the transesterification reaction of glycerides with mono-alcohols is a specific embodiment of the present invention. Suitable monoalcohols include C1-C10 monoalcohols, in particular C1-C5 monoalcohols, more in particular C1-C3 monoalcohols, specifically methanol. The glycerides are mono-di- and esters of glycerol and fatty acids, the fatty acids generally having 10-18 carbon atoms, Suitable processes for manufacturing biodiesel with associated glycerol are known in the art.

The aliphatic polycarboxylic acid used in the present invention comprises at least two carboxylic acid groups, in particular at least three carboxylic acid groups. In general, the number of carboxylic acid groups will be 10 or less, more in particular 8 or less, or even 6 or less. The polycarboxylic acid has 3-15 carbon atoms. More in particular, the polycarboxylic acid has 3-10 carbon atoms. It is preferred for the polycarboxylic acid to contain no N or S heteroatoms. More specifically it is preferred for the polycarboxylic acid to contain no non-carbon groups than the carboxylic acid groups. More in particular the polycarboxylic acid is an aliphatic polycarboxylic acid containing only C, H, and O atoms.

In one embodiment a dicarboxylic acid is used. The dicarboxylic acid, if used, may be any dicarboxylic acid which has two carboxylic acid groups and, in general, at most 15 carbon atoms. Examples of suitable dicarboxylic acids include itaconic acid, malic acid, succinic acid, glutaric acid, adipic acid and sebacic acid. Itaconic acid and succinic acid may be preferred.

In one embodiment a tricarboxylic acid is used. The tricarboxylic acid, if used, may be any tricarboxylic acid which has three carboxylic acid groups and, in general, at most 15 carbon atoms. Examples include citric acid, isocitric acid, aconitic acid (both cis and trans), and 3-carboxy-cis, cis-muconic acid. The use of citric acid is considered preferred, both for reasons of costs and of availability.

Where applicable the polycarboxylic acid may be provided as a whole or in part in the form of an anhydride, e.g., citric acid anhydride.

It has been found that the use of tricarboxylic acid results in a polyester with attractive properties. Therefore, in one embodiment, the polyacid comprises at least 10 wt. % of tricarboxylic acid, whether or not in combination with dicarboxylic acids, other tricarboxylic acids, and mixtures thereof. In one embodiment the polyacid comprises at least 30 wt. % of tricarboxylic acid, calculated on the total amount of polyacid, preferably at least 50 wt. %. In one embodiment the amount of tricarboxylic acid is at least 70 wt. %, more in particular at least 90 wt. %, or even at least 95 wt. %. In one embodiment the polyacid consists essentially of tricarboxylic acid, wherein the word essentially means that other acids may be present in amounts that do not affect the properties of the material.

In another embodiment of the invention the acid comprises at least 10 wt. % of dicarboxylic acid, calculated on the total amount of acid, preferably at least 30 wt. %, more preferably at least 50 wt. %. In one embodiment the amount of dicarboxylic acid is at least 70 wt. %.

In one embodiment the acid comprises a combination of at least 10 wt. % of tricarboxylic acid and at least 2 wt. % of dicarboxylic acid, more in particular at least 10 wt. % of tricarboxylic acid and at least 5 wt. % of dicarboxylic acid, or at least 10 wt. % of tricarboxylic acid and at least 10 wt. % of dicarboxylic acid. In this embodiment the weight ratio between the two types of acid may vary within wide ranges, depending on the properties of the desired material. In one embodiment, the dicarboxylic acid makes up between 2 and 90 wt. % of the total of dicarboxylic and tricarboxylic acid, in particular between 5 and 90 wt. %, more in particular between 10 and 90 wt. %, depending on the properties of the desired material. It is noted that the preferred ranges for the tricarboxylic acid specified above are also applicable to this embodiment. It has been found that the use of a tricarboxylic acid, in particular citric acid, results in the formation of a high-quality composite material, in particular in combination with the use of a trialcohol such as glycerol.

Not wishing to be bound by theory we believe that there are a number of reasons why the use of a tri-acid, in particular in combination with a tri-ol results in the formation of a high-quality composite material. In the first place, the use of a tri-acid, in particular in combination with a tri-ol, makes for a highly crosslinked polymer, resulting in increased strength. Further, where a tri-acid, and preferably also a tri-ol is used, there is a large possibility of acid or hydroxyl groups to physically or chemically interact with active groups on the cellulose-based material. This leads to improved bonding between the cellulose-based material and the polymer, which is a key desire in creating composite materials. The degree of interaction can be controlled by selection of the amount of triacid and trialcohol, and by selecting the degree of polymerization.

The molar ratio between the polyalcohol and the polyacid will be governed by the ratio between the number of reacting groups in the alcohol(s) and acid(s) used. In general, the ratio between the number of OH groups and the number of acid groups is between 5:1 and 1:5. More in particular, the ratio may between 2:1 and 1:2, more specifically between 1.5:1 and 1:1.5, more preferably between 1.1:1 and 1:1.1. The theoretical molar ratio is 1:1.

The polymer is formed by combining the alcohol and the acid to form a liquid phase. Depending on the nature of the compounds this can be done, e.g., by heating a mixture of components to a temperature where the acid will dissolve in the alcohol, in particular in glycerol. Depending on the nature of the compounds this may be, e.g., at a temperature in the range of 20-200° C., e.g., 40-200° C., e.g. 60-200° C., or 90-200° C. In one embodiment, the mixture may be heated and mixed for a period of 5 minutes to 2 hours, more specifically 10 minutes to 45 minutes, at a temperature of 100-200° C., in particular 100-150°, more in particular at a temperature in the range of 100-140° C.

Optionally a suitable catalyst can be used for the preparation of the polyester. Suitable catalysts for the manufacture of polyester are known in the art. Preferred catalysts are those that do not contain heavy metals. Useful catalysts are strong acids like, but not limited to, hydrochloric acid, hydroiodic acid and hydrobromic acid, sulfuric acid ($H_2SO_4$), nitric acid ($HNO_3$), chloric acid ($HClO_3$), boric acid, perchloric acid ($HClO_4$) trifluoroacetic acid, and trifluoromethanesulfonic acid. Catalysts like Zn-acetate and Mn-acetate can also be used, although they may be less preferred.

Optionally, after polymerization and cooling of the reaction mixture, the mixture can be (partially) neutralized with a volatile base like ammonia or an organic amine to stabilize the polyester solution. Preferred amines are amines with a low odour like, but not limited to 2-amino-2-ethyl-1,3-propanediol, 2-amino-2-methyl-1-propanol, 2-dimethylamino-2-methyl-1-propanol.

In one embodiment compounds are added to increase the interaction of the polymer with hydrophobic materials, or to increase the water resistance of the final product. Suitable compounds include for example, C5 to C22 saturated or unsaturated fatty acids or salts thereof, C5 to C22 saturated or unsaturated fatty alcohols, and dimeric and trimeric fatty acids or alcohols. For example, glycerol monostearate, triethyl citrate, and valeric acid have been used successfully in this invention.

The compounds to increase hydrophobicity will generally be applied in an amount of 0.1-5 wt. %, calculated on the amount of the polymer, more in particular in an amount of 0.3-3 wt. %.

The layered material comprising a layer of a structural material provided with a composite surface layer comprising structural material and a polyester derived from an aliphatic polyol with 2-15 carbon atoms and an aliphatic polycarboxylic acid with 3 to 15 carbon atoms is generally prepared by contacting the surface of a structural material with a liquid medium comprising polymer until the structural material is partially but not completely impregnated with the liquid medium, followed by a curing step.

In the present application the extent of polymerization of the monomers will be expressed as conversion, which is the ratio of the fraction of functional groups that have reacted at a certain point in time to the maximum of those functional groups that can react.

The conversion can be determined from the acid value of the reaction mixture as compared to the theoretical acid value of the total of the monomers present. Conversion can also be determined gravimetrically, from the water loss that occurs during the polymerization reaction.

In general, the polymer as it is applied onto the high-void-fraction starting material will have a conversion, determined by way of the acid value, in the range of 0.05 to 0.6, in particular in the range of 0.1 to 0.5, more in particular 0.2-0.5.

After curing, the degree of conversion, determined gravimetrically, will generally be at least 0.6, in particular at least 0.7, more in particular at least 0.8, in some embodiments at least 0.9. The maximum degree of conversion is 1.0.

As it is intended to obtain an object which contains a layer of structural material and a composite surface layer comprising structural material and a polyester it is important that the manufacturing conditions are selected such that the liquid medium does not penetrate the entirety of the structural material. This effect is governed, among others, by the following parameters: the manner of application of the liquid medium, the amount of liquid medium, the viscosity of the liquid medium, the absorptive capacity of the structural material that is to be impregnated with the liquid medium, and the polymerization rate of the polymer in the absorbed medium.

The viscosity of the liquid medium is determined, e.g., by the degree of conversion of the polyester in the medium, the temperature, and the optional presence of solvents such as water. The polymerization rate of the polymer is determined, e.g., by the presence of a catalyst, the temperature, and the efficiency of water removal (water is a side product in the reaction). Given these parameters it is within the scope of the skilled person to select suitable contacting conditions.

For example: a structural material may be contacted at room temperature with an aqueous solution of the polyester. It is also possible to contact a structural material with the polyester in liquid form at elevated temperature.

The liquid medium comprising polymer may be applied onto the high-void-fraction starting material via methods known in the art, such as dipping, spraying, flowing, rolling, brushing, or cascading.

Dipping the structural material in a liquid medium comprising the polymer has been found to be advantageous, as it results in a surface layer with a reproducible thickness. The process is easy to apply by placing the layered material in a polymer bath for a controlled portion of time.

Where it is desired to provide surface layers on both sides of a panel, it is possible to apply polymer layers on either side of the panel, followed by a single curing step. However, it may be preferred to apply a first layer to one side of the panel, effect a curing step, and then apply a second layer on the other side of the panel, followed by a second curing step.

After application of the polyester on the structural material, the resulting impregnated material is subjected to a curing step to increase the degree of polymerization of the polyester. The crux of the curing step is that the polyester is at reaction temperature, e.g., a product temperature of 80-250° C., in particular between of 100-200° C. Curing can be carried out in heating apparatus known in the art, e.g., in an oven with an oven temperature from 80° C. up to 450° C. Different types of ovens may be used, including but not limited to belt ovens, tunnel ovens, convection ovens, microwave ovens, infrared ovens, induction oven, hot-air ovens, conventional baking ovens and combinations thereof. Curing can be done in a single step, or in multiple steps, depending on the desired application. The curing times range from 5 seconds up to 2 hours, depending on the application and on the type of oven and temperature used. It is within the scope of a person skilled in the art to select suitable curing conditions, depending on the desired application and desired properties. It may be preferred to carry out the curing step in an inert gas atmosphere, e.g., under nitrogen, in particular in the absence of oxygen. The use of an inert atmosphere allows the use of higher curing temperatures while limiting the occurrence of undesired oxidation reactions.

If so desired, the impregnated material may be subjected to a drying step before the curing step is carried out. The drying step, which is generally carried out at a temperature of room temperature, e.g., 15° C., or 20° C., to 100° C. is carried out to remove water from the composite. It can be carried out, for example for 0.25 hours to 3 days, depending on the amount of water in the composite, the thickness of the layer, and the temperature.

In one embodiment, the application of a further surface layer is incorporated into the manufacture of the layered material according to the invention. In this case, a surface material is applied onto the panel after the provision of the polymer, but before the curing step, and the combined structure is provided to the curing step. This method allows the manufacture of panels with attractive properties, such as attractive surface structures and improved surface strength. The surface material may be a layer, e.g., a woven or non-woven textiles. In this case, the surface layer preferably is porous, so that it can absorb polymer. Surface materials also encompass other materials which change the surface of the product, e.g., powder, flakes, or other materials.

The layered materials according to the invention can be used as insulation materials for heat and sound, in manners known in the art. In view of the improved surface properties of the materials according to the invention, a cover layer such as gypsum or other plate material can often be dispensed with. This new material may also find application in other situations where high-void fraction materials are used, e.g., filtration and hydroponic applications.

Some preferred manners of processing the material according to the invention will be discussed below.

It has been found that the materials of the present invention have better mechanical properties and better self-standing properties than the starting materials from which they derive. This makes it possible to process them in novel manners. In one embodiment, a material according to the invention of which the front face, preferably the front face and the rear face, and in particular the front face, the rear face, and the sides have been provided with a composite layer, is provided as self-standing structure, optionally after having been provided with a frame, and/or with strengthening structures such as beams incorporated therein.

It has been found that the panels prepared according to the invention, in particular the cellulose-based panels can easily be provided with openings to accommodate, for example, sockets for electricity, cables, etc. Openings can be provided after application of the polymer, in which case the increased mechanical strength makes the panel easy to process, or before application of the polymer, in which case the later provision of the polymer will ensure a smooth and strong surface for the opening. It is also possible to provide the panels, before or after application of the polymer, with structures which allow connecting the panels to each other, structures which allow connecting the panel to other structures, e.g., walls, frames, etc.

The improved mechanical strength of the panels, and in particular the panel surface, makes it possible to provide fastening means such as screws directly onto the panel.

If so desired, the surface of the final layered material can be provided with a cover layer, e.g., in the form of plaster, paint or wallpaper.

The disclosure also includes the following clauses:

1. Layered high-void-fraction material comprising a composite surface layer comprising structural material and a polyester derived from an aliphatic polyol with 2-15 carbon atoms and an aliphatic polycarboxylic acid with 3 to 15 carbon atoms, wherein the surface layer is connected to a high-void-fraction layer of structural material.
2. Layered high-void-fraction material according to clause 1, which has a void fraction of at least 0.5, in particular at least 0.6, more in particular at least 0.7, and in general at most 0.98, in particular at most 0.95.
3. Layered high-void-fraction material according to any one of the preceding clauses, wherein the structural material is selected from ceramic wool, including glass wool and stone wool, polymer-based materials, animal-derived materials such as wool and down, and cellulose-based materials, and combinations thereof, with cellulose-based materials being preferred.
4. Layered high-void-fraction material according to any one of the preceding clauses, wherein the starting material has void fraction of at least 0.5, in particular at least 0.6, more in particular at least 0.7, still more in particular at least 0.8, and/or at most 0.995, in particular at most 0.98.
5. Layered high-void-fraction material according to any one of the preceding clauses, wherein the composite surface layer has a polymer content in the range of 50 wt. % to 98 wt. %, more in particular in the range of 70 wt. % to 95 wt. %, calculated on the weight of the composite surface layer.
6. Layered high-void-fraction material according to any one of the preceding clauses wherein the composite surface layer has a void fraction in the range of 0.01 to 0.99, in particular in the range of 0.4 to 0.95.
7. Layered high-void-fraction material according to any one of the preceding clauses wherein looking at the cross-section of the layered material of the invention, the composite surface layer or layers make up at most 50% of the cross-section, wherein where both surfaces of the layered material are provided with composite surface layers, the composite surface layers together preferably make up 2-50% of the cross-section, in particular 5-40% and where only one surface of the material is provided with a composite surface layer, the composite surface layer preferably makes up 2-30% of the cross-section, in particular 5-20%.
8. Layered high-void-fraction material according to any one of the preceding clauses wherein the aliphatic polyalcohol is selected from the group of trialcohols selected from glycerol, sorbitol, xylitol, and mannitol, and dialcohols selected from 1,2-propanediol, 1,3-propanediol, and 1,2-ethanediol, in particular from the group of glycerol, sorbitol, xylitol, and mannitol, more in particular glycerol.
9. Layered high-void-fraction material according to any one of the preceding clauses wherein I the aliphatic polycarboxylic acid is selected from the group of dicarboxylic acids selected from the group of itaconic acid, malic acid, succinic acid, glutaric acid, adipic acid and sebacic acid and tricarboxylic acids selected from the group of citric acid, isocitric acid, aconitic acid (both cis and trans), and 3-carboxy-cis,cis-muconic acid, in particular from the group of itaconic acid, succinic acid, and citric acid, more in particular citric acid.
10. Method for manufacturing a layered high-void-fraction material according to any one of the preceding clauses, which comprises a step of contacting the surface of a structural material with a liquid medium comprising polymer until the structural material is partially but not completely impregnated with the liquid medium, and a curing step.
11. Method according to clause 10, wherein the step of contacting the surface of the structural material with a liquid medium is carried out through dipping, spraying, flowing, rolling, brushing or cascading, in particular through dipping.
12. Method according to clause 9 or 10, wherein the curing step is carried out at a product temperature of 80-250° C., in particular 100-200° C., preferably in an inert atmosphere.
13. Method according to any one of clauses 10-12, wherein the application of a further surface layer is incorporated into the manufacture of the layered material according to the invention by applying a further material onto the material after the provision of the polymer, but before the curing step, and providing the combined structure to the curing step.
14. Use of the material according to any one of clauses 1-9 as insulating material, as filtration material, or in hydroponics.
15. Method for processing the material according to any one of clauses 1-9, wherein one or more of the following steps are carried out:
  a material according to any one of clauses 1-9 of which the front face, preferably the front face and the rear face, and in particular the front face, the rear face, and the sides have been provided with a composite layer, is provided as self-standing structure, optionally after having been provided with a frame, and/or with strengthening structures such as beams incorporated therein;
  a material according to any one of clauses 1-9, in particular a material based on cellulose-based material is provided with openings, before or after application of the polymer;
  a material according to any one of clauses 1-9, in particular a material based on cellulose-based material is provided with structures which allow connecting the panels to each other, structures which allow connecting the panel to other structures;
  a material according to any one of clauses 1-9, in particular a material based on cellulose-based material is provided with fastening means.

The present invention will be elucidated by the following examples, without being limited thereto or thereby.

EXAMPLE 1

Cellulose-Based Panels—Front Face and Rear Face

A prepolymer mixture was prepared as follows: 1.0 kg of >99% pure glycerol and 2.0 kg of citric acid (purity >99%) were put in a stirred and heated reactor. As catalyst 9 g of boric acid (0.5 m/m, >99% purity) was added. The mixture was heated up in about 15 minutes until 135° C. and kept at that temperature for 15 minutes. Then, tap-water was added to a polymer concentration of 20 wt. %, and the mixture was cooled down to room temperature. The polymer has a conversion of 0.4.

This recipe was repeated as often as necessary to obtain the desired amount of polymer solution.

A cellulose based (recycled cardboard/paper) insulation panel (8×50×120 cm), commercially available from EverUse with a void fraction of 0.92 and a density of 90 grams per liter was immersed for 20 minutes at room temperature with one surface side in a layer (approx. 1 cm deep) of polymer solution as described above. This was done to allow the panel to absorb part of the polymer. After 20 minutes the panel was removed from the polymer layer and turned so that the wet side was facing up. When the panel stopped dripping (approx. 5 min.) the panel was subjected to a curing step for 90 minutes at 170° C. (oven temperature) in a ventilation oven. The panel allowed to cool and absorb moisture for a day. A second layer of coating was applied by immersing the panel with the uncoated side in a layer of polymer solution as described above for 30 minutes. The panel was then removed from the polymer layer and turned so that the wet layer was facing up. When the panel stopped dripping (approx. 5 min.) the panel was subjected to a curing step in an oven for 90 minutes at 170° C. Both sides of the panel are now coated and let to cool an absorb moisture. When both sides were coated and cured, the panel was subjected to a second curing step (170° C. for 60 min) after 24 h of rest at room temperature, and this treatment was repeated after a further 24 hours.

Analogous panels were prepared with higher curing temperatures and shorter curing times (190° C. for 45 minutes), and shorter dipping times (6-10 minutes).

The resulting product was a cellulose-based panel with a composite surface layer on both sides with a thickness of on average 0.8 cm, a density of 0.55 kg/liter and a void fraction of 0.62. The overall density of the panel (composite and non composite part) was around 180 gram/liter. The overall void fraction of the panel was 0.86, which is 93% of the void fraction of the starting material.

No foam formation was observed during panel manufacture. Heating the polymer as such under the conditions applied here generally results in foam formation. Apparently, in panel manufacture all water was removed effectively without causing foam.

Furthermore, the panel was odourless, with a hard surface. The panel could easily be processed, e.g., through sawing and sanding. The composite layer is also vapor permeable, which means that the good climate regulation characteristics of the cellulose material are maintained.

An important property of the impregnated panel is that it is self-standing, which is not the case for the starting materials. FIG. 1 shows a picture of the panel according to the invention (top) and its starting material (bottom). As can be seen from the figure, the product according to the invention has a high bending stiffness, while the starting material does not.

Figure 2:
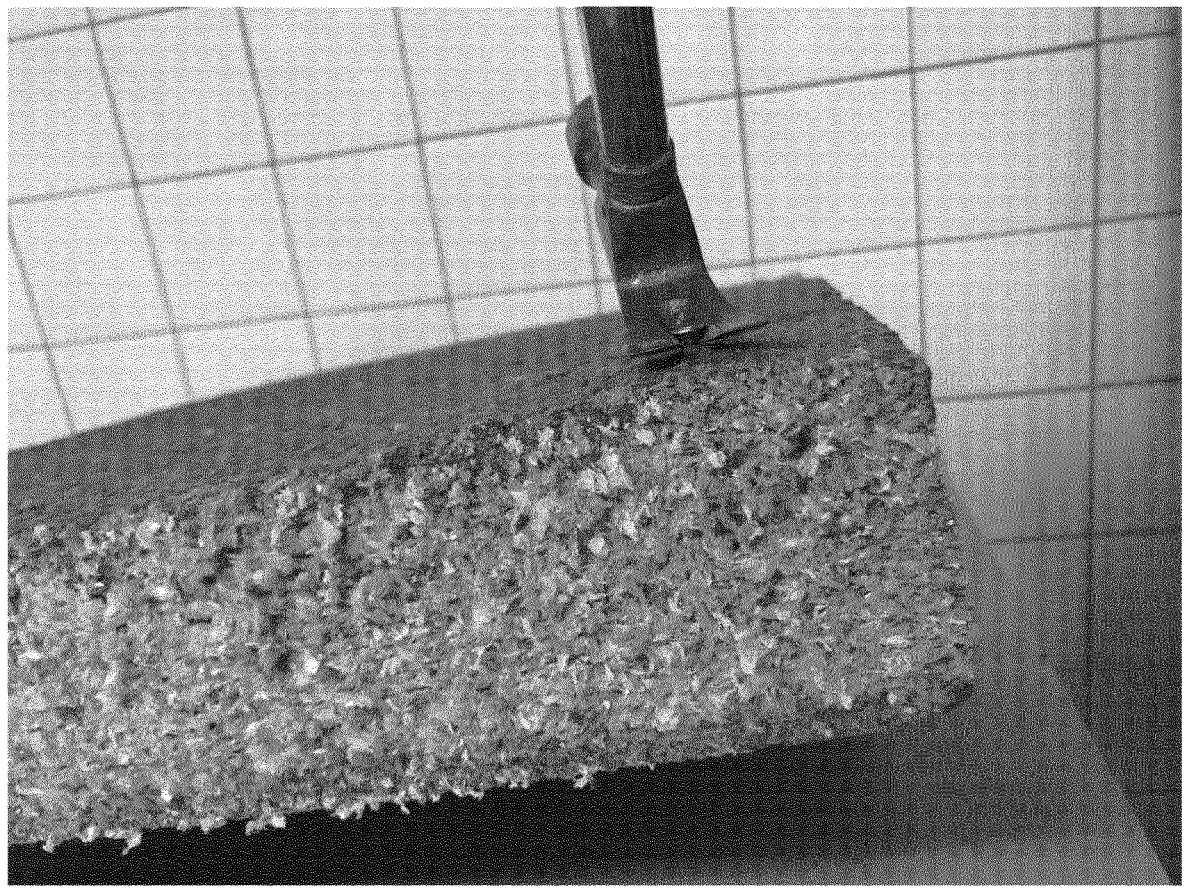
FIG. 2 shows the strength of the surface of a panel according to the invention.

It was found that the panel is a good surface for painting, and that the surface layers were sufficiently rigid to allow the application of fastening means, such as screws. FIG. 2 shows the strength of the surface of the panel according to the invention. A screw has been applied into the panel, and it is possible to lift the panel by way of the screw. When a screw is provided in the same way in the starting material, it is torn from the material immediately when force is applied.

The panel had good moisture and water-resistance. After 1 hour in boiling water the composite surface layer was still intact.

Noise Absorbing Properties

The starting insolation panels are characterised by good noise absorbing properties. It is desirable to maintain these properties upon application of a composite layer. Therefore, a model experiment was set up to test the noise absorbing effects of the impregnated Everuse panels as prepared above.

A box was made consisting of 6 small panels (25*25 cm). The front face panel of the box was of the material to be tested. A sound generator was placed in the box, facing the front face panel. The sound source had a constant tone of 432 Hz. A dB meter was placed outside the box, at a distance of 30 cm from the sound generator. The dB meter measured continuously for a period of one minute, and generated an average value, which is given in the table below.

The 'Blanc' measurement, where no front panel was used yielded a value of 91 dB. The uncoated panel gave a result of 82 dB. The other panels all yielded values in the same range, showing that the provision of a composite layer did not detrimentally affect the sound-absorbing properties of the panel.

| Type of panel | dB |
| --- | --- |
| None | 91 |
| Uncoated panel | 82 |
| 1 side coated (coated side to sound source) | 83 |
| 1 side coated (uncoated side to sound source) | 82 |
| Double coated panel | 83 |
| All sides coated | 81 |

Mechanical Strength

To determine the mechanical strength of the composite layer part of the composite layer was separated from the panel. Pieces of composite layer were sawn with a length of 90 mm, a width of 19 mm, and a thickness of 8 mm. For comparative purposes pieces with the same dimensions were prepared from non-impregnated plates. Tests were carried out in a Testrometic (M350-20CT) equipped for a 3-point flex test with a span of 80 mm. The compression speed was 1 mm/min. The breaking strength of the composite layer sample was on average 70 Newton. The pieces of non-treated panel could not hold a span of 80 mm and collapsed under their own weight.

Fire Resistance

To test the fire resistance of the composite layer, a flame torch as held to the surface of the composite layer of the panel for 5 minutes. The result was a blackened surface, but the surface layer did not catch fire.

EXAMPLE 2

Cellulose-Based Panel—Benefits of Side Impregnation

A panel can be impregnated on 6 sides to improve the overall strength of the panel and minimize the need for additional mechanical support framing of the panels. So not only the top and bottom of the panel are impregnated but also the edges of the panel with the aim to test the effect of on the strength of the panel.

A panel was manufactured as follows, using the starting material and the polymer solution described in Example 1. The front of the panel was placed in a polymer solution for 20 minutes to absorb the polymer. The panel was heated in a ventilation oven for 1.5 hour at 170° C. Next, the four sides and the rear of the panel were coated by placing, one after another, each side for 20 minutes in the polymer solution. Afterwards, the panel was heated again to 170° C., for 1 hour. The thickness of all composite layers was about 8 mm. The presence of composite layers on all sides of the panel resulted in very rigid panels in all directions. Panels with different sizes have been made.

To investigate the influence of impregnating the panel sizes on the compression strength of the panel, a panel was prepared as described above, except that only the sides of the panel were impregnated, while the top and the bottom were not. The compression properties were tested using a universal testing machine (UTM) (Testrometic, M350-20CT), equipped with compression plates. The panels with four impregnated sides showed an average compression strength of 642 N. Panels which had not been impregnated showed a compression strength of virtually 0. This shows that impregnating the sides of the panel significantly improves the compression strength of the panel.

EXAMPLE 3

Further Uses of the Panels

Figure 3:
FIG. 3 shows an example where a beam has been incorporated between two panels.
Figure 4:
FIG. 4 shows a self-standing structure of a set of panels in a frame.

The panels according to the invention can be provided with internal strengthening or connecting means such as beams or frames, to provide ready-to-use self-standing structures. FIG. 3 shows an example where a beam has been incorporated between two panels. FIG. 4 shows a self-standing structure of a set of panels in a frame.

EXAMPLE 4

Other Materials

High void-fraction mats of several other materials were subjected to the process according to the invention. The starting materials were two stone wool materials of different densities, glass wool, hemp mats, and flexible open-cell polyurethane foam. The properties of the starting materials are in the table below.

In these examples, a polymer composition was used as describe in Example 1, except that 4.5 grams of glycerol monostearate was added to the polymer composition, to improve the adherence of the polymer to materials with slightly hydrophobic characteristics.

The mats were impregnated on one side in accordance with the procedure described in example 1, followed by a single curing step. The samples were impregnated for 20 minutes, and cured for three hours at 170° C.

|  | poly urethane | stone wool | stone wool dense | glass wool | Hemp mats | paper/ cardboard- based |
|---|---|---|---|---|---|---|
| void fraction starting material | 0.94 | 0.98 | 0.94 | 0.99 | 0.95 | 0.92 |
| void fraction composite layer | 0.59 | 0.7 | 0.63 | 0.88 | 0.74 | 0.62 |
| thickness starting materials (mm) | 35 | 70 | 50 | 80 | 40 | 80 |
| thickness composite layer (mm) | 6.2 | 3.7 | 2 | 2 | 6 | 8 |

A nice homogeneous 6 mm thick composite layer was obtained after impregnating and curing of the polyurethane mat. The composite layer was hard, strong and had a surface structure similar to the unimpregnated mat and was very easy to process e.g. through sawing and sanding. It was also very suitable for providing with screws.

The impregnated stone wool samples and the glass wool samples had also a nice homogeneous, odorless, relatively thin, and hard composite layers. The hemp mat had a thicker (6 mm) composite layer, which was continuous but less homogeneous than the layers on other materials, related to the rather inhomogeneous structure of the in impregnated hemp mat.

EXAMPLE 5

Incorporation of Cover Layer

Figure 5:
FIG. 5 shows a panel provided with a cloth surface cover.

In one embodiment of the present invention, a porous surface layer is applied on top of the panel before or during impregnation. This allows the manufacture of products with an attractive surface structure, for which further finishing may not be required. In this example, example 1 was repeated, except that a linen woven cloth was applied onto the front surface after impregnation but before curing. The dry cloth was applied onto the wet panel, and absorbed polymer from the panel. The front face of the final product had excellent visual and tactile properties. Additionally, the presence of a cloth may result in an additional increase in strength of the panel. FIG. 5 shows a panel obtained in accordance with this example.

The invention claimed is:

1. A layered high-void-fraction material comprising
   at least one composite surface layer, each composite surface layer present having a void fraction of from 0.4 to 0.95, calculated from a density of the composite surface layer and a density of matter building up the composite surface layer, and each composite surface layer present comprising structural material and a polyester derived from a starting material including an aliphatic polyol with 2-15 carbon atoms and an aliphatic polycarboxylic acid with 3 to 15 carbon atoms,
   wherein each composite surface layer present is connected to a polyester-free high-void-fraction layer of the structural material,
   the layered high-void-fraction material having a void fraction of at least 0.5, calculated from a density of the layered high-void-fraction material and a density of matter building up the layered high-void-fraction material.

2. The layered high-void-fraction material according to claim 1, which has a void fraction of at least 0.6.

3. The layered high-void-fraction material according to claim 1, wherein the structural material is selected from the group consisting of ceramic wool, polymer-based materials, animal-derived materials, cellulose-based materials, and combinations thereof.

4. The layered high-void-fraction material according to claim 1, wherein the structural material has a void fraction of at least 0.5.

5. The layered high-void-fraction material according to claim 1, wherein each composite surface layer present has a polymer content in a range of 50 wt. % to 98 wt. %, calculated based on a weight of the composite surface layer.

6. The layered high-void-fraction material according to claim 1, wherein as viewed in a cross-section of the layered material, the at least one composite surface layer makes up 2-50% of the cross-section when more than one composite surface layer is present, and the at least one composite surface layer makes up 2-30% of the cross-section when one composite surface layer is present.

7. The layered high-void-fraction material according to claim 1, wherein the aliphatic polyalcohol is selected from the group consisting of trialcohols selected from the group consisting of glycerol, sorbitol, xylitol, and mannitol, and dialcohols selected from the group consisting of 1,2-propanediol, 1,3-propanediol, and 1,2-ethanediol.

8. The layered high-void-fraction material according to claim 7, wherein the aliphatic polyalcohol is selected from the group consisting of glycerol, sorbitol, xylitol, and mannitol.

9. The layered high-void-fraction material according to claim 1, wherein the aliphatic polycarboxylic acid is selected from the group consisting of dicarboxylic acids selected from the group consisting of itaconic acid, malic acid, succinic acid, glutaric acid, adipic acid and sebacic acid and tricarboxylic acids selected from the group consisting of citric acid, isocitric acid, cis-aconitic acid, trans-aconitic acid, and 3-carboxy-cis,cis-muconic acid.

10. The layered high-void-fraction material according to claim 9, wherein the aliphatic polycarboxylic acid is selected from the group consisting of itaconic acid, succinic acid, and citric acid.

11. The layered high-void-fraction material according to claim 1, which has a void fraction of at least 0.7, and, at most, 0.98.

12. The layered high-void-fraction material according to claim 1, wherein the aliphatic polyalcohol is glycerol or the aliphatic polycarboxylic acid is citric acid.

13. The layered high-void fraction material according to claim 1, wherein the aliphatic polyalcohol comprises at least 50 mole % of glycerol and the polycarboxylic acid comprises at least 50 wt. % of tricarboxylic acid.

14. An insulating material, filtration material, or a material suitable for use in hydroponics comprising the layered high-void-fraction material according to claim 1.

15. A method for processing the layered high-void-fraction material according to claim 1, comprising one or more of the following steps:
providing the layered high-void-fraction material as a self-standing structure;
providing openings in the layered high-void-fraction material;
providing the layered high-void-fraction material with structures configured for connecting panels comprising the layered high-void-fraction material to each other and/or structures configured for connecting one said panel to another structure; and
providing the layered high-void-fraction material with a fastening means.

16. A method for manufacturing a layered high-void-fraction material according to claim 1, comprising: a step of contacting a surface of the structural material with a liquid medium comprising the polyester until the structural material is partially but not completely impregnated with the liquid medium; a step of optionally contacting a second surface of the structural material with the liquid medium until the structural material is further but not completely impregnated with the liquid medium; and curing the partially impregnated structural material.

17. The method according to claim 16, wherein the step and the optional step of contacting the surface of the structural material with the liquid medium is carried out by dipping, spraying, flowing, rolling, brushing or cascading.

18. The method according to claim 16, wherein the curing step is carried out at a product temperature of 80-250° C.

19. The method according to claim 18, wherein the curing step is carried out at a product temperature of 100-200° C. and in an inert atmosphere.

20. The method according to claim 16, further comprising a step of applying a further material onto the layered material after the contacting step, but before the curing step to form a combined structure, and providing the combined structure to the curing step.

* * * * *